(12) United States Patent
Huberman et al.

(10) Patent No.: US 10,778,555 B2
(45) Date of Patent: Sep. 15, 2020

(54) NETWORK-TRAFFIC PREDICTOR AND METHOD

(71) Applicant: CABLE TELEVISION LABORATORIES, INC., Louisville, CO (US)

(72) Inventors: Bernardo Huberman, Palo Alto, CA (US); Scott H. Clearwater, Menlo Park, CA (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 0 days.

(21) Appl. No.: 16/375,782

(22) Filed: Apr. 4, 2019

(65) Prior Publication Data

US 2019/0312802 A1 Oct. 10, 2019

Related U.S. Application Data

(60) Provisional application No. 62/652,786, filed on Apr. 4, 2018.

(51) Int. Cl.
*H04L 12/26* (2006.01)
*H04L 12/24* (2006.01)

(52) U.S. Cl.
CPC ...... *H04L 43/0882* (2013.01); *H04L 41/0896* (2013.01)

(58) Field of Classification Search
CPC .............. H04L 41/0896; H04L 41/147; H04L 41/5025; H04L 43/0882
See application file for complete search history.

(56) References Cited

U.S. PATENT DOCUMENTS

| | | | |
|---|---|---|---|
| 6,754,177 B1 * | 6/2004 | Gersht | H04L 12/5601 370/230 |
| 7,568,045 B1 * | 7/2009 | Agrawal | H04L 41/142 709/223 |

(Continued)

OTHER PUBLICATIONS

"A Novel Method of Network Burst Traffic Real-Time Prediction Based on Decomposition", Xinyu, Yang et al.; P. Lorenz and P. Dini (Eds.): ICN 2005, LNCS 3420, pp. 784-793, 2005. (Year: 2005).*

*Primary Examiner* — Kashif Siddiqui
(74) *Attorney, Agent, or Firm* — Lathrop GPM LLP

(57) ABSTRACT

A method for predicting network-traffic bursts includes identifying, in data received by a networking device, a plurality of network-traffic bursts, each of the plurality of network-traffic bursts occurring at a respective one of plurality of burst-times $\{t_N, t_{N-1}, \ldots, t_0\}$. The method includes determining a time-interval $\tau_n$ of a next burst occurring at $\tau_n$ after burst-time $t_1$ by determining respective values of $\tau_n$, a parameter $\xi$, and a parameter $\eta$, that minimize, to within a tolerance, a quantity $(f_k(\xi, \eta, k)-(\tau_n-t_k))$ for at least three values of a integer k. Parameters $\xi$ and $\eta$ are, respectively, a real and imaginary part of a power-law exponent of a power law relating predicted time-interval $\tau_n$ to any of the plurality of burst-times. The method includes determining, from a cumulative distribution function of a normal distribution of previously-identified network-traffic bursts, a time-duration during which the networking device may reallocate bandwidth.

18 Claims, 4 Drawing Sheets

(56) References Cited

U.S. PATENT DOCUMENTS

| | | | | |
|---|---|---|---|---|
| 2002/0018473 A1* | 2/2002 | Hassell | ................... | H04L 41/00 370/395.1 |
| 2002/0056007 A1* | 5/2002 | Gersht | ................... | H04L 47/10 709/235 |
| 2003/0202471 A1* | 10/2003 | Murooka | ................... | H04L 1/20 370/232 |

* cited by examiner

600

610
Identify, in data received by a networking device, a plurality of network-traffic bursts, each of the plurality of network-traffic bursts occurring at a respective one of plurality of burst-times $\{t_N, t_{N-1}, ..., t_0\}$, $N \geq 3$.

↓

620
Determine a time-interval $\tau_n$ of a next burst occurring at $\tau_n$ after burst-time $t_1$ by determining respective values of predicted time-interval $\tau_n$, a parameter $\xi$, and a parameter $\eta$ that minimize, to within a tolerance, a quantity $(f_k(\xi,\eta,k) - (\tau_n - t_k))$ for three values of a positive integer $k \leq N$, parameters $\xi$ and $\eta$ being, respectively, a real part and an imaginary part of a power-law exponent of a power law relating predicted time-interval $\tau_n$ to any of the plurality of burst times.

622
Determine values $\xi_{min}$ and $\eta_{min}$ of parameters $\xi$ and $\eta$ as those that minimize, within a predetermined tolerance a combination of $(f_k(\xi,\eta,k) - (\tau_n - t_k))$ for $k = 1, 2, ..., N$.

624
Determine $\tau_n$ as an average of burst intervals $\tau_k = t_k + f_k(\xi_{min}, \eta_{min}, k)$, $k = 1, 2, ..., N$.

↓

630
Determine, from a cumulative distribution function of a normal distribution of previously-identified network-traffic bursts occurring within a time-interval that includes a previously-predicted burst-time $\tau_p$ similar to predicted time-interval $\tau_n$, a time-duration during which the networking device may reallocate bandwidth.

632
Determine the time-duration from a mean burst-time $\mu_p$ and a standard deviation $\sigma_p$ of the normal distribution.

634
Determine the time duration as $(\sqrt{2}) \cdot \sigma_p \cdot \text{erf}^{-1}(1-2\text{QoS}) + \mu_p$, where QoS is a predetermined metric related to a probability of having sufficient bandwidth during the time duration.

636
Determine the mean burst-time $\mu_p$ and the standard deviation $\sigma_p$ by curve-fitting the previously-identified network-traffic bursts.

↓

640
Reallocate bandwidth during the time-duration

FIG. 6

NETWORK-TRAFFIC PREDICTOR AND METHOD

RELATED APPLICATIONS

This application claims benefit of priority to U.S. Provisional Patent Application Ser. No. 62/652,786, filed on Apr. 4, 2018, which is incorporated herein by reference.

BACKGROUND

Efficient allocation of bandwidth across a communication network is an important contributor to the network's quality of service (QoS) to its users. Intermittent bursts in network traffic poses a challenge to efficient bandwidth allocation, as communication channels experiencing such bursts have fluctuating bandwidth requirements. Allocating too little bandwidth to a channel results in sluggish data transmission when bursts occur. Allocating the channel sufficient bandwidth to accommodate bursts is inefficient, as the channel does not utilize its full bandwidth during relatively low data-rate periods occurring between bursts.

SUMMARY OF THE EMBODIMENTS

In a first aspect, a method for predicting network-traffic bursts is disclosed. The method includes identifying, in data received by a networking device, a plurality of network-traffic bursts, each of the plurality of network-traffic bursts occurring at a respective one of plurality of burst-times $\{t_N, t_{N-1}, \ldots, t_0\}$, $N \geq 3$. The method also includes determining a time-interval $\tau_n$ of a next burst occurring at $\tau_n$ after burst-time $t_1$ by determining respective values of predicted time-interval $\tau_n$, a parameter $\xi$, and a parameter $\eta$. Time-interval $\tau_n$, parameter $\xi$, and parameter $\eta$ minimize, to within a tolerance, a quantity $(f_k(\xi, \eta, k) - (\tau_n - t_k))$ for at least three values of a positive integer $k \leq N$. Parameters $\xi$ and $\eta$ are, respectively, a real part and an imaginary part of a power-law exponent of a power law relating predicted time-interval $\tau_n$ to any of the plurality of burst-times. The method also includes determining, from a cumulative distribution function of a normal distribution of previously-identified network-traffic bursts associated with a previously-predicted burst-time $\tau_p$, a time-duration during which the networking device may reallocate bandwidth according to at least one of traffic type, a subnet mask, and IP address. Previously-predicted burst-time $\tau_p$ differs from predicted time-interval $\tau_n$ by less than a predetermined tolerance.

In a second aspect, network-traffic burst predictor is disclosed. The network-traffic burst predictor includes a processor communicatively coupled to both a networking device and a memory. The memory stores non-transitory computer-readable instructions that, when executed by the processor, control the processor to execute the method of the first aspect.

BRIEF DESCRIPTION OF THE FIGURES

FIG. 6 is a flowchart illustrating a method for predicting network-traffic bursts, in an embodiment.

DETAILED DESCRIPTION OF THE EMBODIMENTS

Figure 1:
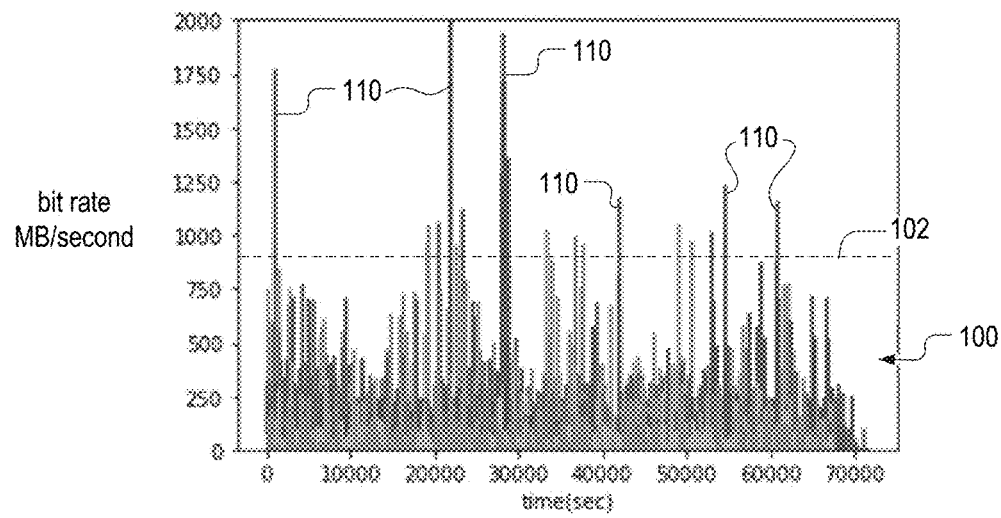
FIG. 1 is a plot of a bit-rate of information transmitted by a communication channel as a function of time.

FIG. 1 is a plot of a bit-rate 100 of information transmitted by a communication channel as a function of time. Bit-rate 100 includes a plurality of network-traffic bursts 110, which correspond to when network traffic exceeds a threshold data rate denoted by threshold line 102. In embodiments, threshold line 102 is a multiple of the standard deviation of network-traffic bursts 110.

Embodiments disclosed herein employ a quantitative method for predicting the timing of bursts in communication network traffic, e.g. wireline communication network traffic or wireless communication network traffic. The predictions may be used to reallocate bandwidth in more optimal ways. For example, if the next burst is predicted to occur no earlier than the minutes from now with a certain probability, then these ten minutes of underutilized bandwidth may be reallocated to other uses.

In embodiments, a burst prediction model relies a power law distribution for the cumulative bytes that flow between bursts. Equation (1) is of simple power-law distribution:

$$\Sigma \text{bytes} = C(\tau_n - t)^\beta, \quad (1)$$

where $\tau_n$ is a predicted time-interval before the next burst, $\tau_n > t$, and $\beta$ is an index that, in embodiments, is positive and less than unity, such as $\xi = 0.84$.

The flow of bytes per unit time is given by the derivative of the equation (1), equation (2), where $\alpha = \beta - 1 < 0$.

$$\text{Flow} = C(\tau_n - t)^\alpha \quad (2)$$

In general, exponent $\alpha$ can be written as complex number $\alpha = \xi + i\eta$, which enables equation (2) to be expressed as equation (3), where $(\tau_n - t)^{i\eta}$ is replaced by $\text{Re}\{\cos(\eta \ln(\tau_n - t)) + i \sin(\eta \ln(\tau_n - t))\} = \cos(\eta \ln(\tau_n - t))$, which ensures a non-complex value for data rate.

$$\text{Flow} = C(\tau_n - t)^\xi \cos[\eta \ln(\tau_n - t)] \quad (3)$$

Bursts by their very nature are local maxima of equation (3), such that they can be found by taking the first derivative of equation (3) and setting it equal to zero, as shown in equation (4).

$$\frac{dFlow}{dt} = -C\xi(\tau_n - t)^\xi \cos[\eta \ln(\tau_n - t)] + C(\tau_n - t)^\xi \eta \sin[\eta \ln(\tau_n - t)] = 0 \quad (4)$$

Eliminating common factors and dividing by the cosine term yields equation (5).

$$\xi \tan[\eta \ln(\tau_n - t_k) \pm k\pi] = \xi/\eta \quad (5)$$

In equation (5), the $k\pi$ term denotes the kth maximum at time $t_k$. Applying the inverse tangent function to equation (5) and exponentiating both sides yields:

$$\eta \ln(\tau_n - t) \pm k\pi = \arctan(\xi/\eta) \quad (6)$$

Solving equation (6) for $\tau_n$ and choosing the $+k\eta$ yields equation (7), which relates the time to the next burst as measured from the kth previous burst:

$$\tau_n = t_k + \exp[\eta^{-1} \arctan(\xi/\eta) + k\pi/\eta]. \quad (7)$$

In general, the time of the burst at predicted burst-interval $\tau_n$ can be found given $\eta$ and any two prior bursts $p_1$ and $p_2$, from the following equation:

$$\tau_n=(t_{p_1}-t_{p_2}e^{(p_1-p_2)\pi/\eta})/(1-e^{(p_1-p_2)\pi/\eta}) \quad (8)$$

Figure 2:
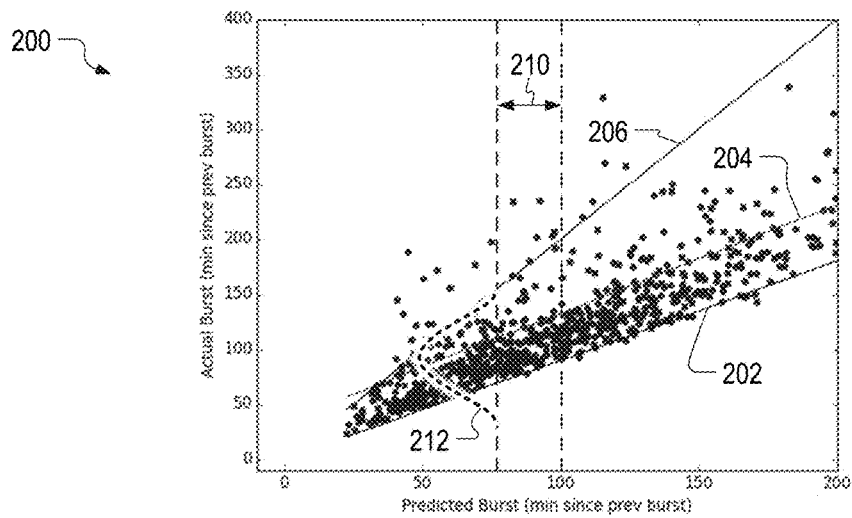
FIGS. 2 and 3 each include a scatter plot of measured burst times vs. predicted burst times, in embodiments.

FIG. 2 is a scatter plot 200 of measured burst times vs. predicted burst times predicted using equation (7). Bursts in scatter plot 200 correspond to bit rates that exceed two standard deviations of a mean bit-rate calculated in a trailing one-hour window. Scatter plot 200 includes one-thousand data points each of which represents one burst.

Line 202 is a best-fit line to scatter plot 200 generated by applying N=6 measured burst times to equation (7), where $\mathcal{M} = \{m_5, m_4, m_3, m_2, m_1, m_0\}$ denote the N measured burst times. In burst-time set $\mathcal{M}$, burst-time $m_{k+1}$ occurs before burst-time $m_k$. The measured burst times were applied to equation (7) as shown in equations (9a)-(9e), hereinafter equations (9), to determine best-fit values of values of $\xi$ and $\eta$, denoted herein as $\xi_{fit}$ and $\eta_{fit}$, via a Levenberg-Marquardt method. In embodiments, other curve-fitting, minimization, and/or optimization methods may be used to determine $\xi_{fit}$ and $\eta_{fit}$.

$$m_0=m_1+\exp[\eta^{-1}\arctan(\xi/\eta)+\pi/\eta] \quad (9a)$$

$$m_0=m_2+\exp[\eta^{-1}\arctan(\xi/\eta)+2\pi/\eta] \quad (9b)$$

$$m_0=m_3+\exp[\eta^{-1}\arctan(\xi/\eta)+3\pi/\eta] \quad (9c)$$

$$m_0=m_4+\exp[\eta^{-1}\arctan(\xi/\eta)+4\pi/\eta] \quad (9d)$$

$$m_0=m_5+\exp[\eta^{-1}\arctan(\xi/\eta)+5\pi/\eta] \quad (9e)$$

The values for $\xi_{fit}$ and $\eta_{fit}$ determined from equations (9), were applied again to equation (7) to predict next-burst estimates $\tau_{1-5}$, as shown in equations (10a)-(10e).

$$\tau_1=m_0+\exp[\eta_{fit}^{-1}\arctan(\xi_{fit}/\eta_{fit})+\pi/\eta_{fit}] \quad (10a)$$

$$\tau_2=m_1+\exp[\eta_{fit}^{-1}\arctan(\xi_{fit}/\eta_{fit})+2\pi/\eta_{fit}] \quad (10b)$$

$$\tau_3=m_2+\exp[\eta_{fit}^{-1}\arctan(\xi_{fit}/\eta_{fit})+3\pi/\eta_{fit}] \quad (10c)$$

$$\tau_4=m_3+\exp[\eta_{fit}^{-1}\arctan(\xi_{fit}/\eta_{fit})+4\pi/\eta_{fit}] \quad (10d)$$

$$\tau_5=m_4+\exp[\eta_{fit}^{-1}\arctan(\xi_{fit}/\eta_{fit})+5\pi/\eta_{fit}] \quad (10e)$$

The predicted next-burst estimates $\tau_{1-5}$ were averaged to yield a mean-predicted next-burst $\bar{\tau}$. Without departing from the scope hereof, the number of measured burst times N used to determine parameter $\xi_{fit}$, parameter $\eta_{fit}$, and mean-predicted next-burst $\bar{\tau}$ may be greater than or less than six.

The computations associated in equations (9) and (10) were repeated several times, each with a respective N-element set $\mathcal{M}$ of measured burst times, to generate scatter plot 200, FIG. 2, where each data point is a measured burst plotted against its corresponding mean-predicted next-burst $\bar{\tau}$. FIG. 2 includes a lower line 202, a best-fit line 204, and an upper line 206. Lower line 202 is nine-tenths of best-fit line 204. Upper line 206 is two times best-fit line 204. Note that nearly all the measured bursts are between lines 202 and 206. Specifically, forty-two measured bursts are below lower line 202 and forty-seven measured bursts are above upper line 206. This means that approximately ninety percent of the measured bursts are within these bounds, and hence the probability that a burst occurs between said bounds is approximately ninety percent. Scatter plot 300, FIG. 3, illustrates similar results for a shorter time interval, and includes lines 302, 304, and 306, which are analogous to lines 202, 204, and 206 of FIG. 2.

Figure 3:
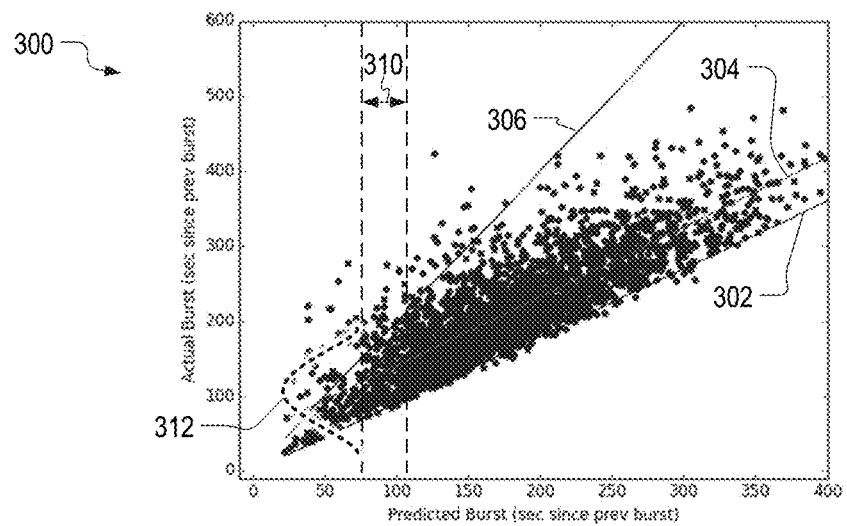

In the examples of FIGS. 2 and 3, approximately twenty percent of the bursts occurred before the predicted burst. That is, approximately twenty percent of the data points in FIGS. 2 and 3 are below respective lines (having slope equal to one) denoting actual burst times that equal predicted burst times. In embodiments, a percentage of the time interval until the next predicted burst $\tau_n$ are be reallocated to other uses. This percentage may correspond to the percentage of bursts occurring after the predicted burst, which in the examples of FIGS. 2 and 3 is eighty percent, which corresponds to a QoS=80%.

For a given interval of predicted bursts, the distributions of measured bursts in FIGS. 2 and 3 may be fit to a normal distribution. For example, measured bursts in FIG. 2 occurring within a time-interval 210 may be fit to a normal distribution 212. Similarly, measured bursts in FIG. 3 within a time-interval 310 may be fit to a normal distribution 312.

Figure 4:
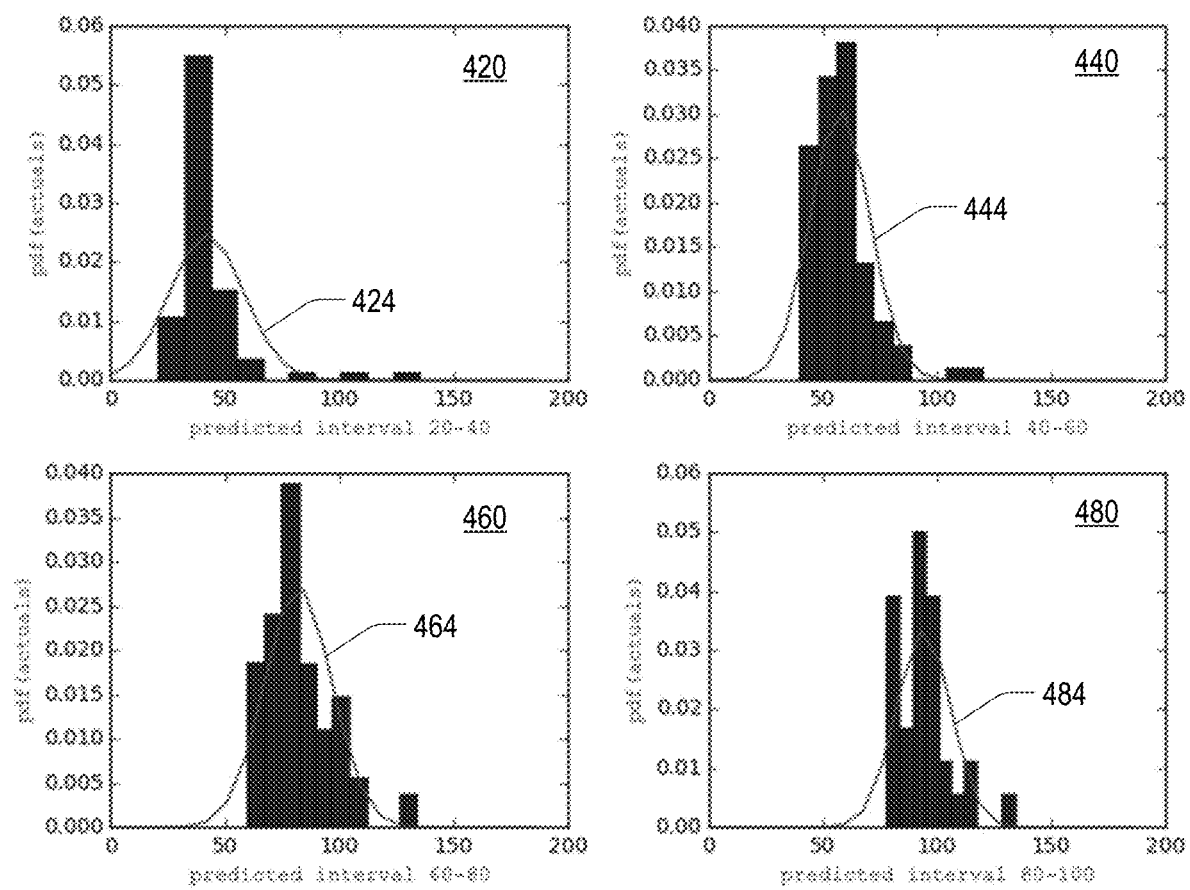
FIG. 4 includes four histograms that illustrate distributions of measured burst times during a time-interval of predicted burst times, in embodiments.

FIG. 4 includes four histograms 420, 440, 460, and 480 that illustrate distributions of measured burst times during a time-interval of predicted burst times. Plots 420-480 each includes a respective normal distribution 424, 444, 464, and 484 fit to a respective histogram 420, 440, 460, and 480. Normal distributions 424-484 are examples of normal distribution 212, FIG. 2, and normal distribution 312, FIG. 3.

The normal distribution of measured bursts with respect to predicted burst-intervals $\tau_n$ enables use the cumulative distribution function (CDF) of the normal distribution to pick a QoS value. For example, in a use scenario, the predicted time-interval until the next burst (predicted burst-interval $\tau_n$) is close to a previously-predicted interval $\tau_p$. In embodiments, previously-predicted interval $\tau_p$ is determined to be the one of P previously-predicted intervals $\tau$ that is closest to predicted burst-interval $\tau_n$. In embodiments, predicted burst-interval $\tau_n$ differs from a previously-predicted interval $\tau_p$ by less than a predetermined difference $\delta\tau$.

The normal distribution associated with previously-predicted interval $\tau_p$ is characterized by a mean-value $\mu_p$ and a standard deviation $\sigma_p$. In such a case, channel resources such as bandwidth may be freed for a time interval $\tau_{free}$ related to the CDF of the normal distribution:

$$\text{CDF}=\tfrac{1}{2}+\tfrac{1}{2}\text{erf}[(\tau_{free}-\mu_p)/\sqrt{2}\sigma_p]. \quad (11)$$

In embodiments, mean-value $\mu_p$ and a standard deviation $\sigma_p$ are averages of normal distributions associated with a quantity Q<P previously-predicted intervals $\tau$ that, among the P previously predicted intervals $\tau$, are closest to predicted burst-interval $\tau_n$. In embodiments, the Q previously-predicted intervals represent a top quantile of the P previously-predicted intervals in terms of their proximity to predicted burst-interval $\tau_n$. The top quantile is, for example, a top decile or smaller group, such as a top two percent.

The value of CDF evaluated at time interval $\tau_{free}$ is the probability that the next burst will occur before predicted burst-interval $\tau_n$. If a network device reallocates bandwidth during a next-burst interval $\tau_{free}$, bursts occurring within next-burst interval $\tau_{free}$ decreases QoS for lack of sufficient bandwidth to accommodate the bursts. Quality of service QoS may be defined as the probability of having sufficient bandwidth during next-burst interval $\tau_n$, or QoS=(1−CDF). When CDF equals zero and one, the probability of bandwidth being insufficient during next-burst interval $\tau_{free}$ is zero and one, respectively. Replacing CDF with QoS in equation (11) and solving for $\tau_{free}$ yields equation (12). That is, for a given $\tau_n$ and contracted CDF=(1−QoS) the resources are freed up for a time given by:

$$\tau_{free}=\sqrt{2}\sigma_p\text{erf}^{-1}(1-2\text{QoS})+\mu_p, \quad (12)$$

where erf$^{-1}$ denotes the inverse error function.

In embodiments, the functional relationship between CDF and QoS differs from CDF=(1−QoS). For example, the quality-of-service metric may be a decreasing function of the cumulative distribution function.

Figure 5:
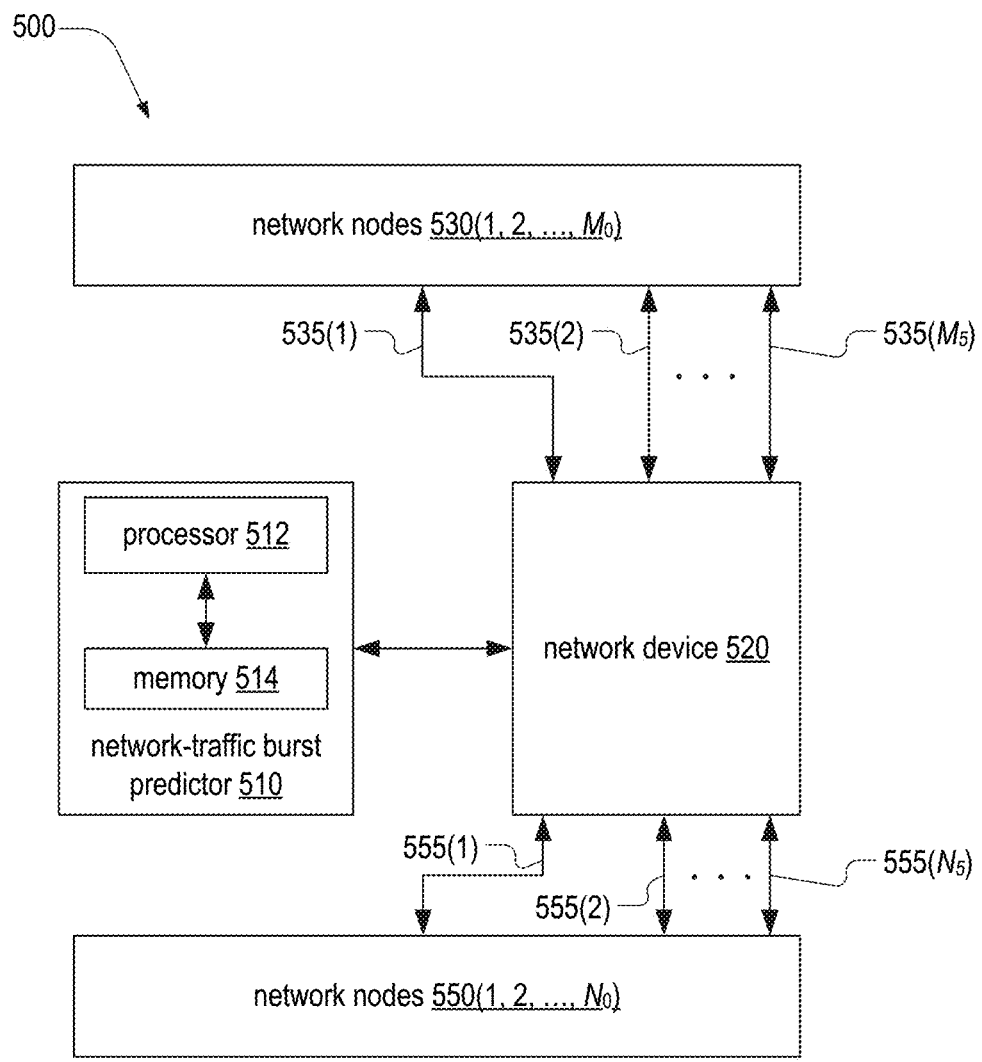
FIG. 5 is a schematic of a network-traffic burst predictor communicatively coupled to a network device within a network, in an embodiment.

FIG. 5 is a schematic of a network 500, which includes a network device 520, a plurality of network nodes 530, a plurality of network nodes 550, and a network-traffic burst predictor 510, hereinafter burst predictor 510. In embodiments, burst predictor 510 is either communicatively coupled to, or part of, network device 520. In embodiments, network device 520 is at least one of a network node, a gateway, a router, a network switch, a network hub, and a base transceiver station.

Network device 520 is communicatively connected to network nodes 530(1-$M_O$) via a plurality of communication channels 535(1-$M_S$). Network device 520 is communicatively connected to network nodes 550(1-$N_O$) via a plurality of network channels 545(1-$N_S$). Traffic on any one of communication channels 535 and 555 may include network traffic bursts, of which network-traffic bursts 110 are an example. Traffic on any of communication channels 535 and 555 may be en route either to or from any one of network nodes 530 and 550. In embodiments, integer $M_S$ may be less than or equal to integer $M_O$, and integer $N_S$ is less than or equal to integer $N_O$.

In some embodiments, network 500 includes part or all of a wireline communication network and/or a wireless communication network. Some examples of possible wireline communication networks include networks operating according to one or more of a data over cable services interface specification (DOCSIS) protocols, digital subscriber line (DSL) protocols, ethernet passive optical network (EPON) protocols, gigabit passive optical network (GPON) protocols, and radio frequency over glass (RFOG) protocols. Some examples of possible wireless networks include networks operating according to one or more of long term evolution (LTE) protocols, fifth generation (5G) new radio (NR) protocols, sixth generation (6G) protocols, Wi-Fi protocols, microwave communication protocols, and Satellite communication protocols.

Burst predictor 510 includes a memory 514 communicatively coupled to a processor 512. Memory 514 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 514 may be integrated into processor 512. Memory 514 includes machine-readable instructions. Processor 512 is adapted to execute the machine-readable instructions to perform functions of burst predictor 510 described herein.

FIG. 6 is a flowchart illustrating a method 600 for predicting network-traffic bursts. Method 600 may be implemented within one or more aspects of burst predictor 510 and/or network device 520. In embodiments, method 600 is implemented by processor 512 executing computer-readable instructions stored as software and/or firmware in memory 514. Method 600 includes at least one of steps 610, 620, 630, and 640.

Step 610 includes identifying, in data received by a networking device, a plurality of network-traffic bursts, each of the plurality of network-traffic bursts occurring at a respective one of plurality of burst-times $\{t_N, t_{N-1}, \ldots, t_0\}$, $N \geq 3$. In an example of step 610, one of network device 520 and burst predictor 510 detects network-traffic bursts in network channel 535(1) of network 500.

Step 620 includes determining a time-interval $\tau_n$ of a next burst occurring at $\tau_n$ after burst-time $t_1$ by determining respective values of predicted time-interval $\tau_n$, a parameter $\xi$, and a parameter $\eta$. Time-interval $\tau_n$, parameter $\xi$, and parameter $\eta$ minimize, to within a tolerance, a quantity ($f_k$ ($\xi$, $\eta$, k)−($\tau_n$−$t_k$)) for at least three values of a positive integer k≤N. Parameters $\xi$ and $\eta$ are, respectively, a real part and an imaginary part of a power-law exponent of a power law relating predicted time-interval $\tau_n$ to any of the plurality of burst-times. In an example of step 620, burst predictor 510 determines mean-predicted next-burst $\bar{\tau}$ from next-burst estimates $\tau_{1-5}$ of equations (10).

In embodiments, step 620 includes at least one of steps 622 and 624. Step 622 includes determining values $\xi_{min}$ and $\eta_{min}$ of parameters $\xi$ and $\eta$ as those that minimize, within a predetermined tolerance a combination of ($f_k$ ($\xi$, $\eta$, k)−($t_n$−$t_k$)) for k=1, 2, ..., N. Step 624 includes determining $\tau_n$ as an average of burst intervals $\tau_k$=$t_k$+$f_k$ ($\xi_{min}$, $\eta_{min}$, k), for k=1, 2, ..., N. In an example of step 622, burst predictor 510 determines parameters $\xi$ and $\eta$ that minimize equations (9) to within a predetermined tolerance. In an example of step 620, burst predictor 624 determines mean-predicted next-burst $\bar{\tau}$ from next-burst estimates $\tau_{1-5}$ of equations (10).

Step 630 includes determining, from a cumulative distribution function of a normal distribution of previously-identified network-traffic bursts associated with a previously-predicted burst-time $\tau_p$, a time-duration during which the networking device may reallocate bandwidth according to at least one of traffic type, a subnet mask, and IP address. Previously-predicted burst-time $\tau_p$ differs from predicted time-interval $\tau_n$ by less than a predetermined tolerance. In an example of step 630, burst predictor 510 determines next-burst interval $\tau_{free}$ per equations (11) and (12).

In embodiments, step 630 includes at least one of steps 632, 634, and 636. Step 632 includes determining the time-duration from a mean burst-time $\mu_p$ and a standard deviation $\sigma_p$ of the normal distribution. In an example of step 632, burst predictor 510 determines next-burst interval $\tau_{free}$ in part from equations (11) and (12), which include mean burst-time $\mu_p$ and standard deviation $\sigma_p$.

Step 634 includes determining the time-duration as $\sqrt{2}\sigma_p$ erf$^{-1}$(1−2QoS)+$\mu_p$, where QoS is a predetermined metric related to a probability of having sufficient bandwidth during the time-duration. In an example of step 634, burst predictor 510 determines next-burst interval $\tau_{free}$ using equation (12).

Step 636 includes determining the mean burst-time $\mu_p$ and the standard deviation $\sigma_p$ by curve-fitting the previously-identified network-traffic bursts. In a first example of step 636, burst predictor 510 fits normal distribution 212 to measured traffic bursts occurring in time-interval 210, FIG. 2, thereby determining a mean value and standard deviation of normal distribution 212. In a second example of step 636, burst predictor 510 fits normal distribution 312 to measured traffic bursts occurring in time-interval 310, FIG. 3, thereby determining a mean value and standard deviation of normal distribution 312. In a third example of step 636, burst predictor 510 fits normal distribution 424, 444, 464, and 484 to respective histograms 420, 440, 460, and 460, FIG. 4, thereby determining a mean value and standard deviation of normal distributions 424-484.

Step 640 includes reallocating bandwidth during the time-duration and according to at least one of traffic type, a subnet mask, and IP address during the time-duration. In an example of step 640, burst predictor 510 reallocated bandwidth from communication channel 535(1) to one or more communication channels 535(2-$M_5$) during next-burst interval $\tau_{free}$.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A method for predicting network-traffic bursts comprising:
   identifying, in data received by a networking device, a plurality of network-traffic bursts, each of the plurality of network-traffic bursts occurring at a respective one of plurality of burst-times $\{t_N, t_{N-1}, \ldots, t_0\}$, $N \geq 3$;
   determining a time-interval $\tau_n$ of a next burst occurring at $\tau_n$ after burst-time $t_1$ by determining respective values of predicted time-interval $\tau_n$, a parameter $\xi$, and a parameter $\eta$ that minimize, to within a tolerance, a quantity $(f_k(\xi, \eta, k) - (\tau_n - t_k))$ for three values of a positive integer $k \leq N$, parameters $\xi$ and $\eta$ being, respectively, a real part and an imaginary part of a power-law exponent of a power law relating predicted time-interval $\tau_n$ to any of the plurality of burst-times; and
   determining, from a cumulative distribution function of a normal distribution of previously-identified network-traffic bursts occurring within a time-interval that includes a previously-predicted burst-time $\tau_p$ similar to predicted time-interval $\tau_n$ by less than a predetermined tolerance, a time-duration during which the networking device may reallocate bandwidth according to at least one of traffic type, a subnet mask, and IP address.

2. The method of claim 1, $f_k(\xi, \eta, k)$ being proportional to $\exp[\eta^{-1}\arctan(\xi/\eta) + k\pi/\eta]$.

3. The method of claim 1, determining time-interval $\tau_n$ including:
   determining values $\xi_{fit}$ and $\eta_{fit}$ of parameters $\xi$ and $\eta$ as those that minimize, within a predetermined tolerance, a combination of $|f_k(\xi, \eta, k) - (t_n - t_k)|$ for $k = 1, 2, \ldots, N$; and
   determining $\tau_n$ as an average of burst intervals $\tau_k = t_k + f_k(\xi_{fit}, \eta_{fit}, k)$, for $k = 1, 2, \ldots, N$.

4. The method of claim 1, determining the time-duration comprising:
   determining the time-duration from a mean burst-time Ip and a standard deviation $\sigma_p$ of the normal distribution.

5. The method of claim 4, further comprising determining the time-duration as $\sqrt{2}\sigma_p \, \text{erf}^{-1}(1 - 2\text{QoS}) + \mu_p$, where QoS is a predetermined metric related to a probability of having sufficient bandwidth during the time-duration.

6. The method of claim 4, further comprising determining the mean burst-time $\mu_p$ and the standard deviation $\sigma_p$ by curve-fitting the previously-identified network-traffic bursts.

7. The method of claim 1, further comprising reallocating bandwidth during the time-duration and according to at least one of traffic type, a subnet mask, and IP address during the time-duration.

8. The method of claim 1, the network device being communicatively coupled to a processor and a memory storing non-transitory computer-readable instructions that, when executed by the processor, control the processor to perform the identifying, predicting, and determining.

9. The method of claim 1, the previously-predicted burst-time $\tau_p$ being at least one of (i) different from predicted time-interval $\tau_n$ by less than a predetermined tolerance and (ii) the one of a quantity of previously-predicted intervals $\tau$ that is closest to predicted burst-interval $\tau_n$.

10. A network-traffic burst predictor comprising:
    a processor communicatively coupled to a networking device; and
    a memory storing non-transitory computer-readable instructions that, when executed by the processor, control the processor to:
       identify, in data received by a networking device, a plurality of network-traffic bursts, each of the plurality of network-traffic bursts occurring at a respective one of plurality of burst-times $\{t_N, t_{N-1}, \ldots, t_0\}$, $N \geq 3$;
       determine a time-interval $\tau_n$ of a next burst occurring at $\tau_n$ after burst-time $t_1$ by determining respective values of predicted time-interval $\tau_n$, a parameter $\xi$, and a parameter $\eta$ that minimize, to within a tolerance, a quantity $(f_k(\xi, \eta, k) - (\tau_n - t_k))$ for three values of a positive integer $k \leq N$, parameters $\xi$ and $\eta$ being, respectively, a real part and an imaginary part of a power-law exponent of a power law relating predicted time-interval $\tau_n$ to any of the plurality of burst-times; and
       determine, from a cumulative distribution function of a normal distribution of previously-identified network-traffic bursts occurring within a time-interval that includes a previously-predicted burst-time $\tau_p$ similar to predicted time-interval $\tau_n$ by less than a predetermined tolerance, a time-duration during which the networking device may reallocate bandwidth according to at least one of traffic type, a subnet mask, and IP address.

11. The network-traffic burst predictor of claim 10, the networking device being at least one of a network node, a gateway, a router, a network switch, a network hub, and a base transceiver station.

12. The network-traffic burst predictor of claim 10, $f_k(\xi, \eta, k)$ being proportional to $\exp[\eta^{-1}\arctan(\xi/\eta) + k\pi/\eta]$.

13. The network-traffic burst predictor of claim 10, the memory further storing non-transitory computer-readable instructions that, when executed by the processor, control the processor to:
    determine values $\xi_{fit}$ and $\eta_{fit}$ of parameters $\xi$ and $\eta$ as those that minimize, within a predetermined tolerance, a combination of $|f_k(\xi, \eta, k) - (t_n - t_k)|$ for $k = 1, 2, \ldots, N$; and
    determine $\tau_n$ as an average of burst intervals $\tau_k = t_k + f_k(\xi_{fit}, \eta_{fit}, k)$, for $k = 1, 2, \ldots, N$.

14. The network-traffic burst predictor of claim 10, the memory further storing non-transitory computer-readable instructions that, when executed by the processor, control the processor to:
    determine the time-duration from a mean burst-time $\mu_p$ and a standard deviation $\sigma_p$ of the normal distribution.

15. The network-traffic burst predictor of claim 14, the memory further storing non-transitory computer-readable instructions that, when executed by the processor, control the processor to:
    determine the time-duration as $\sqrt{2}\sigma_p \, \text{erf}^{-1}(1 - 2\text{QoS}) + \mu_p$, where QoS is a predetermined metric related to a probability of having sufficient bandwidth during the time-duration.

16. The network-traffic burst predictor of claim 14, the memory further storing non-transitory computer-readable instructions that, when executed by the processor, control the processor to:
   determine the mean burst-time $\mu_p$ and the standard deviation $\sigma_p$ by curve-fitting the previously-identified network-traffic bursts.

17. The network-traffic burst predictor of claim 10, the memory further storing non-transitory computer-readable instructions that, when executed by the processor, control the processor to:
   reallocate bandwidth during the time-duration and according to at least one of traffic type, a subnet mask, and IP address during the time-duration.

18. The network-traffic burst predictor of claim 10, the previously-predicted burst-time $\tau_p$ being at least one of (i) different from predicted time-interval $\tau_n$ by less than a predetermined tolerance and (ii) the one of a quantity of previously-predicted intervals $\tau$ that is closest to predicted burst-interval $\tau_n$.

* * * * *